(12) United States Patent
Busking (10) Patent No.: US 7,345,531 B2
(45) Date of Patent: Mar. 18, 2008

(54) COMPARATOR CIRCUIT, RELATED METHOD OF COMPARING A VECTOR TO COMPARISON BOUNDARIES AND TRANSMITTER EMPLOYING THE SAME

(75) Inventor: Erik B. Busking, The Hague (NL)

(73) Assignee: Agere Systems Inc., Allentown, PA (US)

( * ) Notice: Subject to any disclaimer, the term of this patent is extended or adjusted under 35 U.S.C. 154(b) by 1034 days.

(21) Appl. No.: 10/442,738

(22) Filed: May 21, 2003

(65) Prior Publication Data

US 2004/0233599 A1    Nov. 25, 2004

(51) Int. Cl.
*H03F 3/38* (2006.01)
(52) U.S. Cl. ........................................................ 330/10
(58) Field of Classification Search .................... 330/10
See application file for complete search history.

(56) References Cited

U.S. PATENT DOCUMENTS 7,076,698 B2 *  7/2006  Busking ...................... 714/704

FOREIGN PATENT DOCUMENTS

| EP | 0 598 585 A2 | 5/1994 |
| WO | WO 01/24472 A1 | 4/2001 |
| WO | WO 01/56147 A1 | 8/2001 |

\* cited by examiner

*Primary Examiner*—Khanh Van Nguyen (57) ABSTRACT

The present invention is directed to a comparator circuit for use with in-phase and quadrature phase signals and a method of comparing a resultant vector of the in-phase and quadrature phase signals. In one embodiment, the comparator circuit includes a non-titled comparison circuit that compares a resultant vector of the in-phase and quadrature phase signals to vertical and horizontal comparison boundary member pairs. The comparator circuit also includes a tilted comparison circuit, coupled to the non-tilted comparison circuit, that compares the resultant vector to comparison boundary member diagonals coupled to the vertical and horizontal comparison boundary member pairs. The comparator circuit may still further include a combiner circuit that provides a comparison signal based on signals from the non-tilted and tilted comparison circuits.

20 Claims, 6 Drawing Sheets

COMPARATOR CIRCUIT, RELATED METHOD OF COMPARING A VECTOR TO COMPARISON BOUNDARIES AND TRANSMITTER EMPLOYING THE SAME

CROSS REFERENCE TO RELATED APPLICATION

This application is related to U.S. patent application Ser. No. 10/442,623 entitled "A VECTOR MONITOR, METHOD OF CONTROLLING A TRANSMITTER AND TRANSMITTER EMPLOYING THE SAME," to Erik B. Busking, filed concurrently herewith, which is commonly assigned with the present invention and incorporated herein by reference as if reproduced herein in its entirety.

TECHNICAL FIELD OF THE INVENTION

The present invention is directed, in general, to communication systems and, more specifically, to a comparator circuit, method of comparing a resultant vector of in-phase and quadrature phase signals to comparison boundaries, and a transmitter employing the same.

BACKGROUND OF THE INVENTION

As the demand for high-speed telecommunications systems increases, more signal bandwidth is required for use therein. While attempting to augment the available bandwidth of channels within a given transmission frequency range (e.g., 2.5 to five gigahertz range), the combined use of amplitude and phase modulation such as may be found with orthogonal frequency division multiplex (OFDM) signals, has proven difficult to effectively implement. More specifically, the delivery of improved spectral efficiency of transmitted signals in linear modulation schemes typically undergoes significant distortion of both phase and amplitude when the modulated signals are boosted by a power amplifier for transmission to a receiver. The distortion is especially prevalent in transmitters that employ power efficient, but nonlinear, power amplifiers. As a result, linearization techniques have been developed to produce a desirable trade-off between a transmitter's efficiency and its linearity.

Among the more popular linearization techniques employable with transmitters is Cartesian feedback linearization. In this type of linearization technique, a Cartesian feedback section is provided after the power amplifier, which would otherwise introduce undesirable distortion into a modulated output signal. The Cartesian feedback section provides baseband in-phase and quadrature phase feedback signals that are demodulated from the output of the power amplifier. These signals are, by means of operational amplifiers, compared to in-phase and quadrature phase input signals of the power amplifier to provide a "predistortion" into the modulated signal prior to the power amplifier so that distortion introduced by the power amplifier is offset to achieve the desired linearization.

This predistortion essentially straightens or linearizes the nonlinear saturating transfer characteristic of the power amplifier, thereby reducing the overall distortion. If a required power output level of the power amplifier is too large, however, the power amplifier may limit or clip its output signal thereby introducing a distortion level that Cartesian feedback linearization cannot fully correct. Unfortunately, the high operational efficiency of the power amplifiers usually necessitates an operational level that approaches the point of limiting or clipping, thereby presenting an important design and operational dilemma. Additionally, changes in an output load associated with the power amplifier may also cause changes in both loop gain and loop phase, which may lead to feedback loop instability or even oscillation.

An error detection circuit may be employed in cooperation with the Cartesian feedback loop to generate error signals that are proportional to the in-phase and quadrature phase input and feedback signals. When the power amplifier is not limiting or clipping, the input and feedback signals are approximately equal due to high amplifier gains. This condition causes the error signals to be small or substantially zero. However, when the power amplifier is limiting or clipping, the feedback signals are less than the input signals. This condition causes the error signals to be larger thereby indicating a limiting or clipping condition associated with the power amplifier.

A comparator circuit may then be employed treating the error signals as a vector whose magnitude and orientation are proportional to the in-phase and quadrature phase error signals. When the magnitude of this vector exceeds an established comparison boundary, an output of the comparator circuit would indicate that the error signals are too large and that the power gain of the power amplifier should be reduced. To prevent comparison distortion, an ideal comparison boundary would be preferable, but often difficult, and therefore costly, to implement.

Accordingly, what is needed in the art is a way to provide an effective comparison boundary for a comparator circuit employable with in-phase and quadrature phase signals, for instance error signals, that overcomes the deficiencies in the prior art.

SUMMARY OF THE INVENTION

To address the above-discussed deficiencies of the prior art, the present invention provides a comparator circuit for use with in-phase and quadrature phase signals. In one embodiment, the comparator circuit includes a non-tilted comparison circuit that compares a resultant vector of the in-phase and quadrature phase signals to vertical and horizontal comparison boundary member pairs. The comparator circuit also includes a tilted comparison circuit, coupled to the non-tilted comparison circuit, that compares the resultant vector to comparison boundary member diagonals coupled to the vertical and horizontal comparison boundary member pairs. The comparator circuit may still further include a combiner circuit that provides a comparison signal based on signals from the non-tilted and tilted comparison circuits.

The comparator circuit of the present invention, therefore, establishes a comparison boundary formed by the vertical and horizontal comparison boundary member pairs, and the comparison boundary member diagonals that provides an improved and substantially equidistant boundary for comparison of the resultant vector representing the in-phase and quadrature phase signals. As a result, the comparator circuit may reduce the negative effects associated with comparison distortion.

In another aspect, the present invention provides a method of comparing a resultant vector of in-phase and quadrature phase signals that includes comparing the resultant vector to vertical and horizontal comparison boundary member pairs. The method also includes further comparing the resultant vector to comparison boundary member diagonals coupled to the vertical and horizontal comparison boundary member pairs. The method may still further include providing a comparison signal based on signals generated from the comparison of the resultant vector to the vertical and horizontal comparison boundary member pairs and the comparison boundary member diagonals. The method may still further include creating the vertical and horizontal comparison boundary member pairs, and comparison boundary member diagonals prior to performing the acts of comparing the resultant vector thereto. The acts of comparing, however, may occur in any order including substantially concurrently.

In yet another aspect, the present invention provides a transmitter including an input section and a feedback section employing in-phase and quadrature phase signals, and a power amplifier coupled thereto. The transmitter also includes an error detection circuit, coupled to the input and feedback sections, that derives error signal components from the in-phase and quadrature phase signals. The transmitter still further includes a comparator circuit that includes a non-tilted comparison circuit that compares a resultant vector based on the error signal components to vertical and horizontal comparison boundary member pairs of an octagonal comparison boundary. The comparator circuit also includes a tilted comparison circuit, coupled to the non-tilted comparison circuit, that compares the resultant vector to comparison boundary member diagonals of the octagonal comparison boundary. The comparator circuit still further may include a combiner circuit that provides a comparison signal based on signals from the non-tilted and tilted comparison circuits. The transmitter still further includes a control circuit, coupled to the comparator circuit, that controls a power level of the power amplifier based on a comparison signal associated with the non-tilted and tilted comparison circuits.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
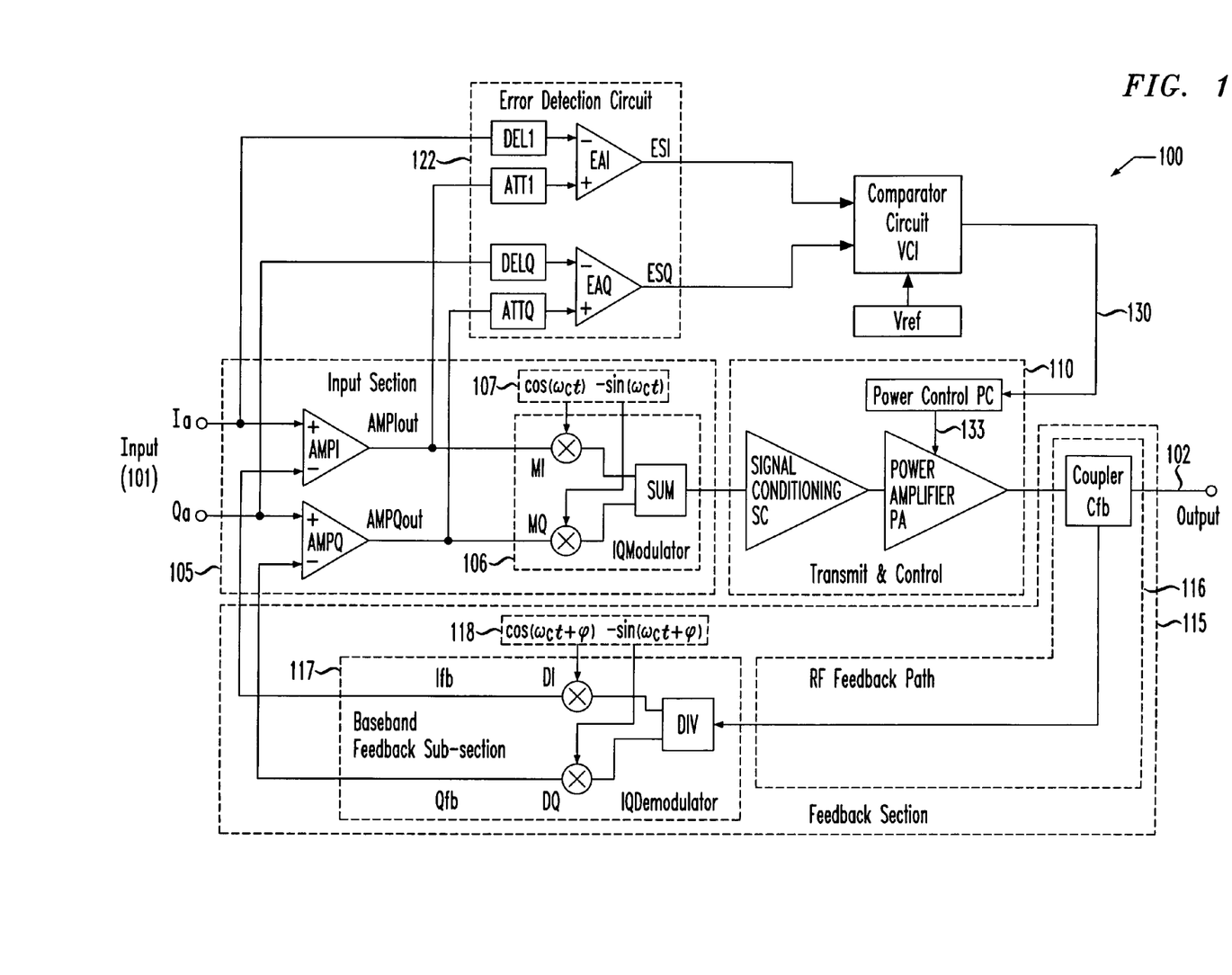
FIG. 1 illustrates a system diagram of an embodiment of a transmitter employing in-phase and quadrature phase input and feedback signals constructed in accordance with the principles of the present invention.

Referring initially to FIG. 1, illustrated is a system diagram of an embodiment of a transmitter, generally designated 100, employing in-phase and quadrature phase (Cartesian) input and feedback signals (wherein both may be referred to as in-phase and quadrature phase signals) constructed in accordance with the principles of the present invention. The transmitter 100 includes an input 101 employing in-phase and quadrature phase input signals Ia, Qa, respectively, and an output 102. The transmitter 100 further includes an input section 105 coupled to the input 101, a transmit and control section 110 coupled between the input section 105 and the output 102, and a feedback section 115, coupled between the output 102 and the input 101, having a radio frequency (RF) feedback path 116 and a baseband feedback subsection 117. The transmitter 100 still further includes an error detection circuit 122 and a comparator circuit VC1.

In the illustrated embodiment, a baseband signal frequency of about eight megahertz is employed, which is modulated onto a carrier frequency of 2.5 to five gigahertz for transmission. The input section 105 includes first and second operational amplifiers AMPI, AMPQ whose output signals AMPIout, AMPQout are applied to an in-phase/quadrature phase (IQ) modulator 106, which employs in-phase/quadrature phase carrier signals 107 originating from a local oscillator. The in-phase/quadrature phase carrier signals 107 employ an in-phase carrier signal $\cos(\omega_c t)$ and a quadrature phase carrier signal $\sin(\omega_c t)$, where $\omega_c$ is the carrier frequency. The in-phase and quadrature phase input signals Ia, Qa and in-phase and quadrature phase feedback signals Ifb, Qfb from the feedback section 115 are applied to the first and second operational amplifiers AMPI, AMPQ to produce respective first and second output signals AMPIout, AMPQout. The IQ modulator 106 includes an in-phase modulator MI, coupled to the in-phase carrier signal $\cos(\omega_c t)$, and a quadrature phase modulator MQ, coupled to the quadrature phase carrier signal $\sin(\omega_c t)$, whose outputs are combined in a summing circuit SUM as an input signal to the transmit and control section 110.

The RF feedback path 116 includes a coupler Cfb that provides an RF feedback signal to the baseband feedback subsection 117. In the illustrated embodiment, the baseband feedback subsection 117 consists of an IQ demodulator, which includes a divider circuit DIV coupled to an in-phase demodulator DI and a quadrature phase demodulator DQ that are also coupled to local oscillator signals 118. The local oscillator signals 118 originate from a local oscillator employing a variable phase shifter and a divider with quadrature outputs (not shown). The local oscillator signals 118 have a phase shifted in-phase carrier signal $\cos(\omega_c t+\phi)$ and a phase shifted quadrature phase carrier signal $\sin(\omega_c t+\phi)$ where $\omega_c$ is the carrier frequency and $\phi$ is a phase shift. The phase shift $\phi$ is a summation of the phase shifts associated with the transmit and control section 110, the coupler Cfb and the IQ demodulator. The in-phase demodulator DI and the quadrature phase demodulator DQ respectively employ the phase shifted in-phase carrier signal $\cos(\omega_c t+\phi)$ and the phase shifted quadrature phase carrier signal $\sin(\omega_c t+\phi)$ to provide the in-phase and quadrature phase feedback signals Ifb, Qfb.

The transmit and control section 110 includes a signal conditioning amplifier SC and a power amplifier PA that employ the input and feedback sections 105, 115 and a power control circuit PC to reduce distortion. The power amplifier PA exhibits a nonlinear, saturating output signal (e.g., voltage) characteristic for larger input signals (e.g., voltage signals). This transfer characteristic would tend to limit useful output power and create unacceptable distortion without employing the benefits of feedback. Distortion may be particularly acute, even with feedback, if the output signal 102 were allowed to limit or clip. The transmit and control section 110 employs the power control circuit PC, coupled to a comparator circuit output 130, to ameliorate this situation.

The error detection circuit 122 includes first and second error amplifiers EAI, EAQ that provide first and second error signal components ESI, ESQ, which are coupled to the comparator circuit VC1. The error detection circuit 122 also includes first and second delay lines DELI, DELQ and first and second attenuators ATTI, ATTQ. The error detection circuit 122 is coupled to the input and feedback signals Ia, Qa, Ifb, Qfb and provides first and second error signal components ESI, ESQ based thereon. The first and second delay lines DELI, DELQ are adjusted to compensate for respective output signal delays associated with the first and second operational amplifiers AMPI, AMPQ. The first and second attenuators ATTI, ATTQ are adjusted to provide substantially zero values of first and second error signal components ESI, ESQ for small input signal excursions. Larger signal excursions will produce non-zero values of the first and second error signal components ESI, ESQ.

The comparator circuit VC1 is coupled to a reference parameter (e.g., reference voltage Vref) and employs a resultant vector based on the first and second error signal components ESI, ESQ. The comparator circuit VC1 provides a comparison signal based on the resultant vector and a comparison boundary (e.g., octagonal comparison boundary) that allows control of a power level of the power amplifier PA. Advantageous embodiments of a comparator circuit constructed in accordance with the principles of the present invention are discussed below.

Figure 2:
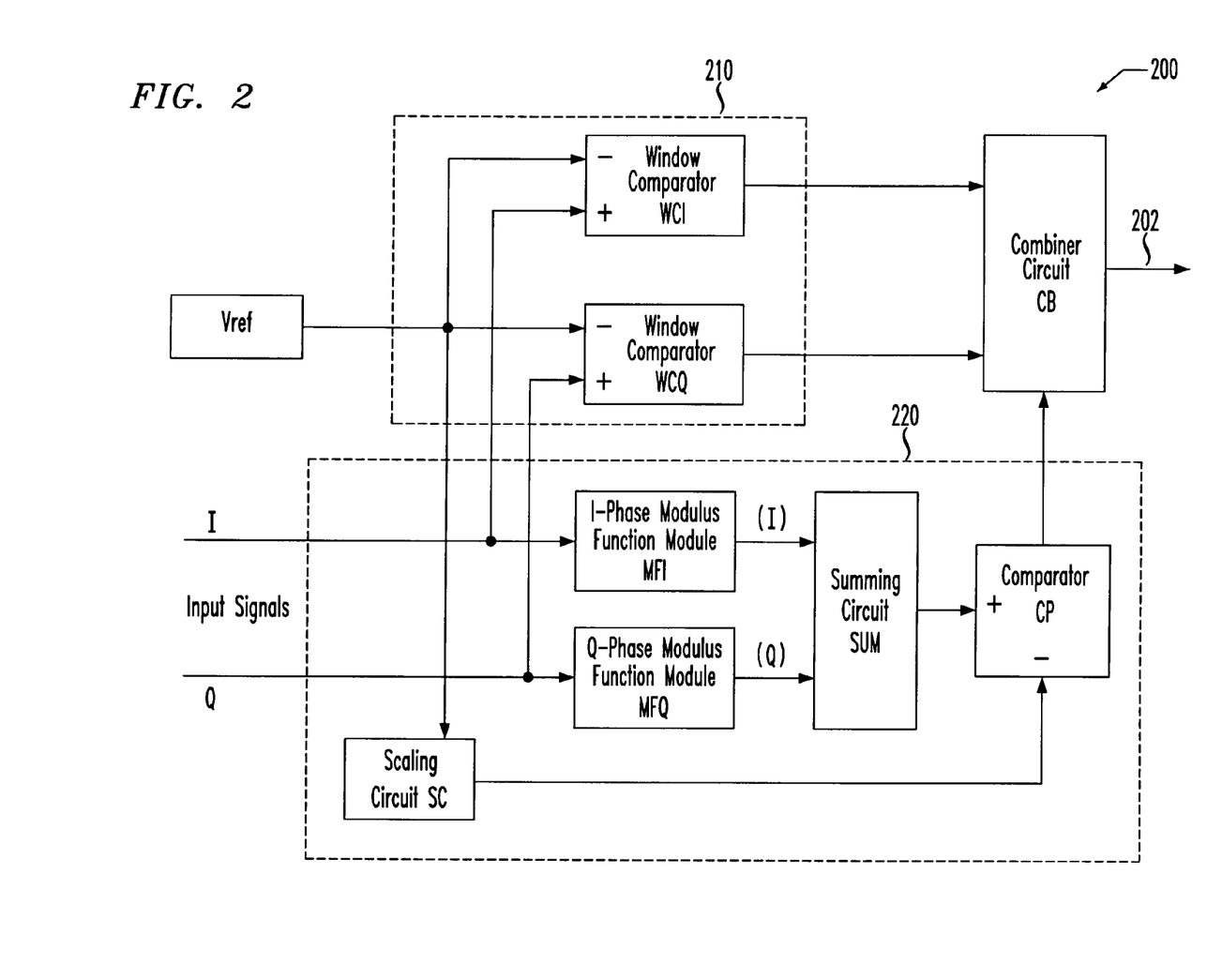
FIG. 2 illustrates a block diagram of an embodiment of a comparator circuit constructed in accordance with the principles of the present invention.

Turning now to FIG. 2, illustrated is a block diagram of an embodiment of a comparator circuit, generally designated 200, constructed in accordance with the principles of the present invention. The comparator circuit 200 includes a non-tilted comparison circuit 210 and a tilted comparison circuit 220, which are coupled to a combiner circuit CB, employ a reference parameter (e.g., reference voltage Vref) and accept input signals to provide a comparison signal 202, as an output. The non-tilted comparison circuit 210 is configured to receive in-phase and quadrature phase signals I, Q as input signals and provide vertical and horizontal comparison boundary member pairs based on the reference voltage Vref. Additionally, the tilted comparison circuit 220 is configured to receive the in-phase and quadrature phase signals I, Q and provide corresponding boundary member diagonals interconnecting the vertical and horizontal comparison boundary member pairs to form a comparison boundary (e.g., octagonal comparison boundary). Of course, the in-phase and quadrature phase signals I, Q may be first and second error signal components ESI, ESQ as was discussed with respect to FIG. 1.

The non-tilted comparison circuit 210 includes first and second window comparators WCI, WCQ whose outputs provide first and second combiner input signals to the combiner circuit CB based on values of the in-phase and quadrature phase signals I, Q. The first window comparator WCI employs the reference voltage Vref to provide a vertical comparison boundary member pair for positive and negative values of the in-phase signal I. Similarly, the second window comparator WCQ employs the reference voltage Vref to provide a horizontal comparison boundary member pair for positive and negative values of the quadrature phase signal Q. The combiner circuit CB may be a three-input OR gate that provides a TRUE value of the comparison signal 202 when any of its inputs indicate that the input signals has exceeded a boundary member. Operational attributes of the non-tilted comparison circuit 210 may be more clearly understood with reference to FIG. 3.

Figure 3:
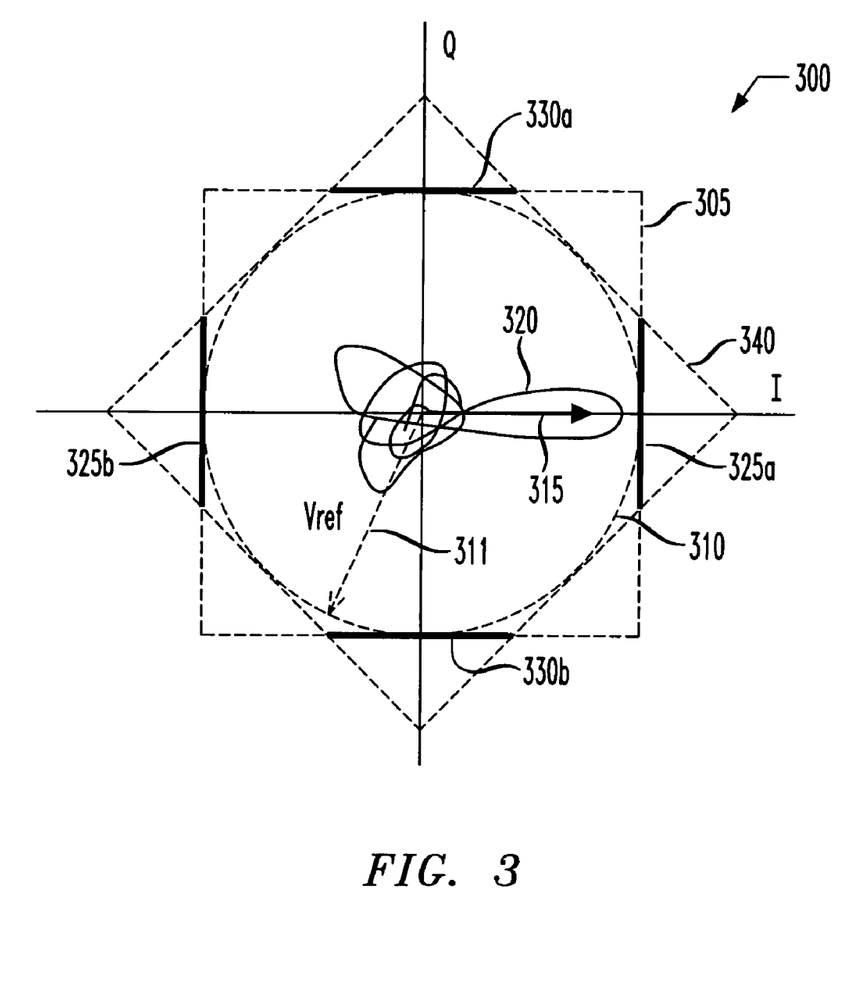
FIG. 3 illustrates a vector diagram showing vertical and horizontal comparison boundary member pairs associated with a non-tilted comparison circuit constructed in accordance with the principles of the present invention.

Turning momentarily to FIG. 3, illustrated is a vector diagram, generally designated 300, showing vertical and horizontal comparison boundary member pairs associated with a non-tilted comparison circuit constructed in accordance with the principles of the present invention. The vector diagram 300 employs axes representing in-phase and quadrature phase signals I, Q and includes a non-tilted comparison boundary 305, a reference circle (e.g., reference voltage circle 310) having a radius 311 equal to a reference parameter (e.g., reference voltage Vref), a resultant vector 315 having a vector locus 320, a vertical comparison boundary member pair 325a, 325b, a horizontal comparison boundary member pair 330a, 330b and a tilted comparison boundary 340.

In the illustrated embodiment, the non-tilted comparison boundary 305 is tangent to the reference voltage circle 310. In alternative embodiments, the reference voltage circle 310 may intersect the non-tilted comparison boundary 305 or the tilted comparison boundary 340 as may be appropriate to a specific requirement. The resultant vector 315 may be seen to be substantially a function of the in-phase signal I with a magnitude that is less than the reference voltage Vref. The vector locus 320 shows a locus of typical magnitudes and directions that the resultant vector 315 may occupy as the in-phase and quadrature phase signals I, Q vary.

The vertical comparison boundary member pair 325a, 325b and the horizontal comparison boundary member pair 330a, 330b may be provided by window comparators, such as the first and second window comparator WCI, WCQ illustrated and described with respect to FIG. 2. The vertical and horizontal comparison boundary member pairs 325a, 325b, 330a, 330b are located along the non-tilted comparison boundary 305 and have substantially equal lengths that are determined by the intersection of the tilted comparison boundary 340 with the non-tilted comparison boundary 305, as shown. The resultant vector 315 may exceed the vertical and horizontal comparison boundary member pairs 325a, 325b, 330a, 330b when the absolute value of the in-phase signal I or the absolute value of the quadrature phase signal Q is greater than the reference voltage Vref (i.e., |I| or |Q|>Vref).

Returning now to FIG. 2, the tilted comparison circuit 220 includes in-phase and quadrature phase modulus function modules MFI, MFQ, a summing circuit SUM, a comparator CP and a scaling circuit SC. The in-phase modulus function module MFI receives the in-phase signal I and provides a first output signal |I|, which is the absolute value of the in-phase signal I. Similarly, the quadrature phase modulus function module MFQ receives the quadrature phase signal Q and provides a second output signal |Q|, which is the absolute value of the quadrature phase signal Q. Then, the first and second output signals |I|, |Q| are summed in the summing circuit SUM yielding a summing output signal |I|+|Q|, which is provided to the comparator CP.

The comparator CP compares the summing output signal |I|+|Q| to a scaled value of the reference voltage Vref provided by the scaling circuit SC. The scaled value of the reference voltage Vref is equal to (SQRT2)Vref [i.e., the square root of two times the reference voltage Vref, which is approximately equal to (1.4142)Vref]. The output of the comparator CP provides a third combiner input signal to the combiner circuit CB. Operational attributes of the tilted comparison circuit 220 may be more clearly understood with reference to FIG. 4.

Figure 4:
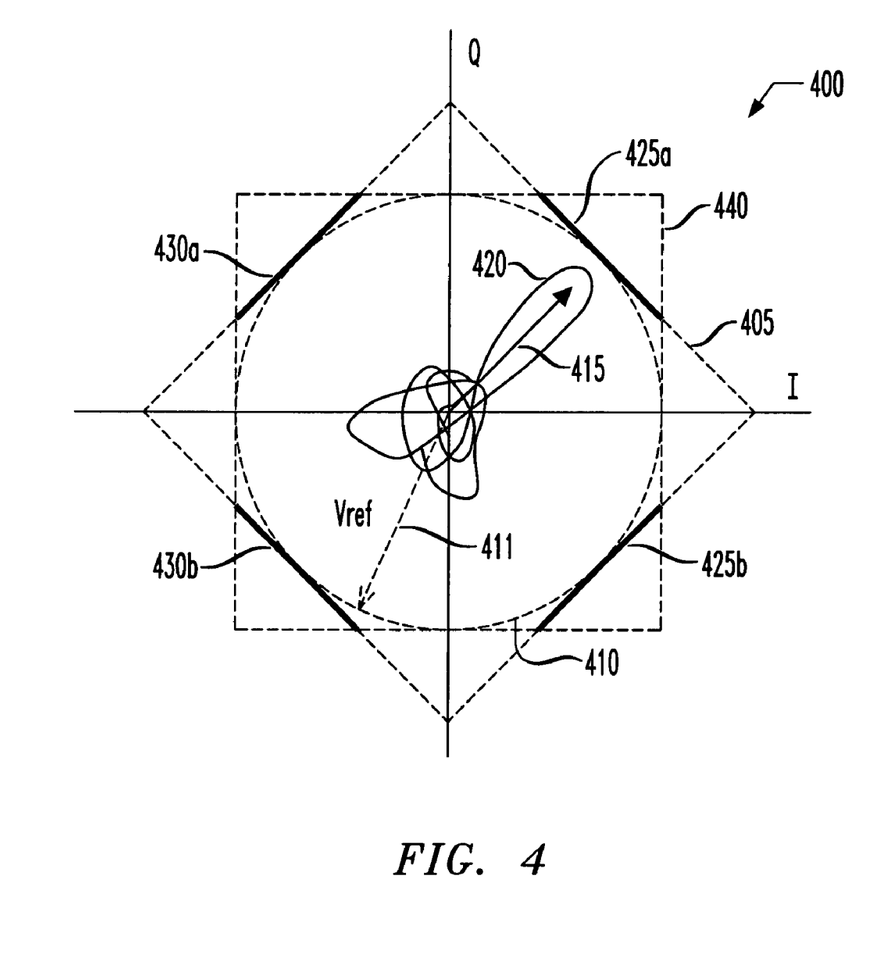
FIG. 4 illustrates a vector diagram showing corresponding boundary member diagonals associated with a tilted comparison circuit constructed in accordance with the principles of the present invention.

Turning now to FIG. 4, illustrated is a vector diagram, generally designated 400, showing corresponding boundary member diagonals associated with a tilted comparison circuit constructed in accordance with the principles of the present invention. The vector diagram 400 employs axes representing in-phase and quadrature phase signals I, Q and includes a tilted comparison boundary 405, a reference circle (e.g., reference voltage circle 410) having a radius 411 equal to a reference parameter (e.g., reference voltage Vref), a resultant vector 415 having a vector locus 420, first, second, third and fourth boundary member diagonals 425a, 425b, 430a, 430b and a non-tilted comparison boundary 440.

In the illustrated embodiment, the tilted comparison boundary 405 is also tangent to the reference voltage circle 410. The resultant vector 415 may be seen to be a function of substantially equal in-phase and quadrature phase signals I, Q with a magnitude that is less than the reference voltage Vref. The vector locus 420 also shows a locus of typical magnitudes and directions that the resultant vector 415 may occupy as the in-phase and quadrature phase signals I, Q vary. The first, second, third and fourth boundary member diagonals 425a, 425b, 430a, 430b may be provided by a tilted comparison circuit such as the tilted comparison circuit 220 illustrated and described with respect to FIG. 2.

The first and second boundary member diagonals 425a, 425b may be associated with a positive value of an in-phase signal I having positive or negative values of a quadrature phase signal Q, respectively. Correspondingly, the third and fourth boundary member diagonals 430a, 430b may be associated with a negative value of an in-phase signal I having positive or negative values of a quadrature phase signal Q, respectively. The boundary member diagonals 425a, 425b, 430a, 430b are located along the tilted comparison boundary 405 and have substantially equal lengths determined by the intersection of the non-tilted comparison boundary 440 with the tilted comparison boundary 405. The resultant vector 415 may exceed the boundary member diagonals 425a, 425b, 430a, 430b when the sum of the absolute value of the in-phase signal I and the absolute value of the quadrature phase signal Q is greater than the reference voltage Vref multiplied by the square root of two [i.e., $|I|+|Q|>(1.4142)Vref$].

Figure 5:
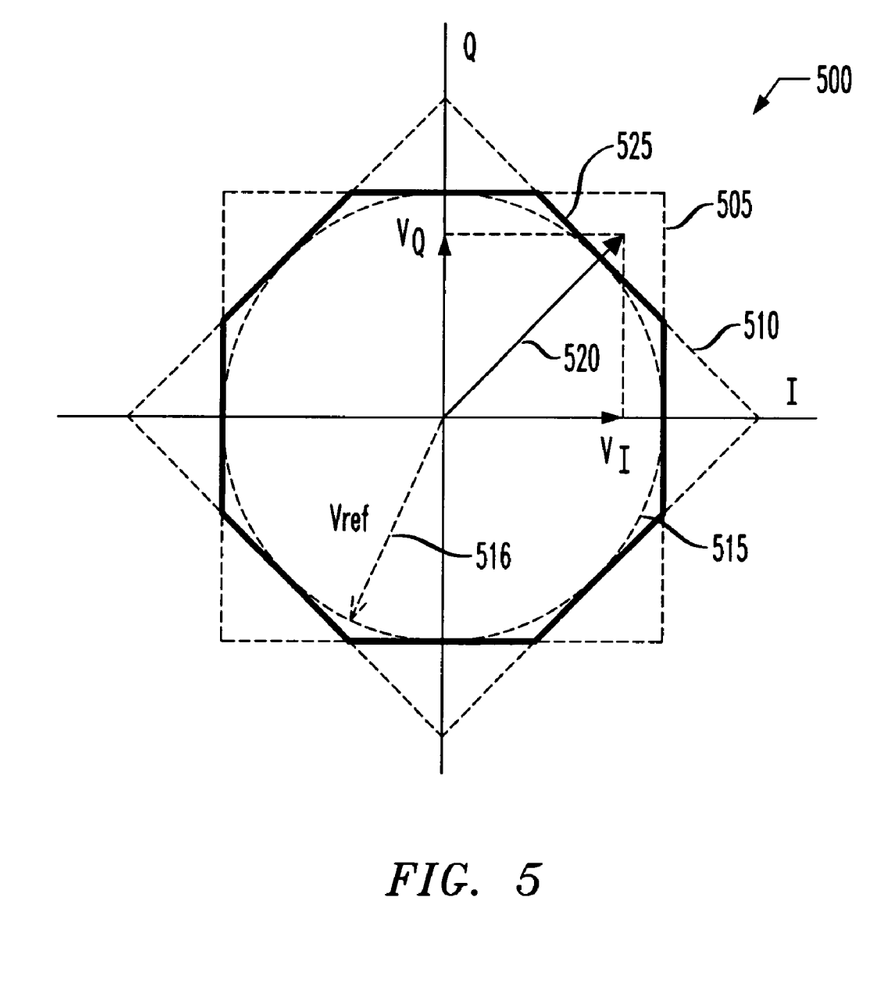
FIG. 5 illustrates a vector diagram showing a comparison boundary constructed in accordance with the principles of the present invention.

Turning now to FIG. 5, illustrated is a vector diagram, generally designated 500, showing a comparison boundary constructed in accordance with the principles of the present invention. The vector diagram 500 employs axes representing in-phase and quadrature phase signals I, Q and includes a non-tilted comparison boundary 505, a tilted comparison boundary 510, a reference circle (e.g., reference voltage circle 515) having a radius 516 equal to a reference parameter (e.g., reference voltage Vref), a resultant vector 520 having in-phase and quadrature phase components $V_I$, $V_Q$ and a comparison boundary (e.g., octagonal comparison boundary 525).

In the illustrated embodiment, the resultant vector 520 may be seen to exceed the octagonal comparison boundary 525 although its in-phase and quadrature phase components $V_I$, $V_Q$ do not exceed the octagonal comparison boundary 525. This condition would cause a comparator circuit employing the octagonal comparison boundary 525 to provide a TRUE output signal. This TRUE output signal may be used to adjust the power level of a power amplifier as was discussed with respect to FIG. 1. Of course, the comparator circuit may be employed in other applications, as required.

In the illustrated embodiment, the octagonal comparison boundary 525 closely approximates the reference voltage circle 515, which may be considered to be an ideal comparison boundary since it is equidistant from the origin. As discussed earlier, however, a comparator circuit employing the octagonal comparison boundary 525 may be constructed from a few basic building blocks whereas a circular comparison boundary is more difficult to implement. Therefore, use of the octagonal comparison boundary substantially provides the benefits of a circular comparison boundary at reduced implementation cost.

Figure 6:
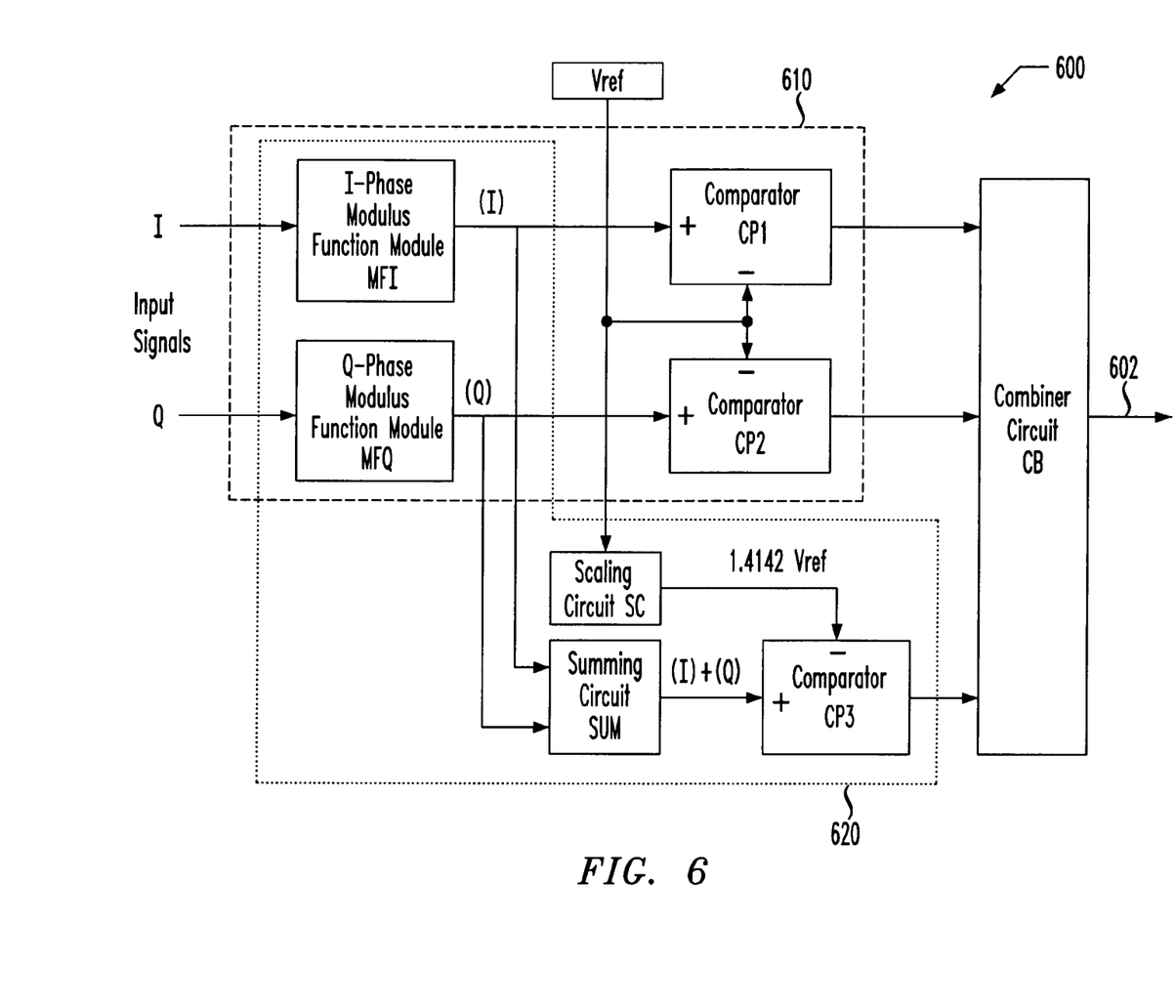
FIG. 6 illustrates a block diagram of another embodiment of a comparator circuit constructed in accordance with the principles of the present invention.

Turning now to FIG. 6, illustrated is a block diagram of another embodiment of a comparator circuit, generally designated 600, constructed in accordance with the principles of the present invention. The comparator circuit 600 also includes a non-tilted comparison circuit 610 and a tilted comparison circuit 620, coupled to a combiner circuit CB, which employ a reference parameter (e.g., reference voltage Vref) and accept input signals to provide a comparison signal 602, as an output. The non-tilted comparison circuit 610 is configured to receive in-phase and quadrature phase signals I, Q as the input signals and provide vertical and horizontal comparison boundary member pairs based on the reference voltage Vref. The tilted comparison circuit 620 is also configured to receive the in-phase and quadrature phase signals I, Q and provide corresponding boundary member diagonals interconnecting these vertical and horizontal comparison boundary member pairs to form a comparison boundary (e.g., octagonal comparison boundary).

The non-tilted comparison circuit 610 includes in-phase and quadrature phase modulus function modules MFI, MFQ, first and second comparators CP1, CP2 and is coupled to the combiner circuit CB. The in-phase modulus function module MFI receives an in-phase signal I and provides an in-phase absolute value output signal $|I|$ to the first comparator CP1. The first comparator CP1 provides the vertical comparison boundary member pairs of the octagonal comparison boundary. Similarly, the quadrature phase modulus function module MFQ receives a quadrature phase signal Q and provides a quadrature phase absolute value output signal $|Q|$ to the second comparator CP2. The second comparator CP2 provides the horizontal boundary member pairs of the octagonal comparison boundary. Outputs of the first and second comparators CP1, CP2 are provided to the combiner circuit CB and indicate when the in-phase or quadrature phase signals I, Q have exceeded the reference voltage Vref thereby providing a TRUE value for the comparison signal 602.

The tilted comparison circuit 620 includes the in-phase and quadrature phase modulus function modules MFI, MFQ, a summing circuit SUM, a third comparator CP3, a scaling circuit SC and is coupled to the combiner circuit CB. The summing circuit SUM receives the in-phase absolute value output signal $|I|$ and the quadrature phase absolute value output signal $|Q|$ and provides a summing output signal $|I|+|Q|$ to the third comparator CP3. The third comparator CP3 employs an output of the scaling circuit SC, which is equal to about the square root of two times the reference voltage Vref as a comparison voltage. The third comparator CP3 therefore provides boundary member diagonals interconnecting the vertical and horizontal boundary member pairs provided by first and second comparison circuits CP1, CP2. An output of the third comparator CP3 is provided to the combiner circuit CB and indicates when a sum of in-phase and quadrature phase signals I, Q has exceeded about 1.4142Vref thereby also providing a TRUE value for the comparison signal 602.

In summary, embodiments of the present invention employing a comparator circuit for use with in-phase and quadrature phase signals have been presented. The comparator circuit may be a polar comparator that generates a comparison boundary (e.g., octagonal comparison boundary) that may be employed with a resultant vector defined by in-phase and quadrature phase signals. The comparison boundary may provide a close approximation to a circular comparison boundary. The comparison boundary may be tailored or fitted around or through a reference circle, proportional to a reference parameter (e.g., reference voltage), that employs relatively few basic circuit building blocks. Although the embodiments presented have been hardware embodiments, the comparator circuit employing a comparison boundary may be implemented in software, as well. Additionally, embodiments employing a reference current, rather than a reference voltage, may also be employed.

Alternative embodiments employing the comparison circuit in a Cartesian feedback system may include observing operational amplifier outputs, a difference in operational amplifier inputs or a difference between operational amplifier inputs and outputs. Additionally, for a transmitter not using Cartesian feedback, it may guard a signal source with two outputs I and Q that are connected to an I/Q modulator, or it may be employed in a receiver having an automatic gain control loop using I and Q signals. Also, it may be prevent a pivoting robot arm employing X and Y coordinates from attempting to reach locations outside of its range.

Although the present invention has been described in detail, those skilled in the art should understand that they can make various changes, substitutions and alterations herein without departing from the spirit and scope of the invention in its broadest form.

What is claimed is:

1. A comparator circuit for use with in-phase and quadrature phase signals, comprising:
    a non-tilted comparison circuit configured to compare a resultant vector of said in-phase and quadrature phase signals to vertical and horizontal comparison boundary member pairs; and
    a tilted comparison circuit, coupled to said non-tilted comparison circuit, configured to compare said resultant vector to comparison boundary member diagonals coupled to said vertical and horizontal comparison boundary member pairs.

2. The comparator circuit as recited in claim 1 further comprising a combiner circuit configured to provide a comparison signal based on signals from said non-tilted and tilted comparison circuits.

3. The comparator circuit as recited in claim 1 wherein said vertical and horizontal comparison boundary member pairs and said boundary member diagonals are substantially equal in length.

4. The comparator circuit as recited in claim 1 wherein said vertical and horizontal comparison boundary member pairs and said comparison boundary member diagonals form an octagonal comparison boundary.

5. The comparator circuit as recited in claim 1 wherein said non-tilted comparison circuit comprises a window comparator.

6. The comparator circuit as recited in claim 1 wherein said tilted comparison circuit comprises an absolute value circuit.

7. The comparator circuit as recited in claim 1 wherein said resultant vector is based on error signal components of said in-phase and quadrature phase signals.

8. A method of comparing a resultant vector of in-phase and quadrature phase signals, comprising:
    comparing said resultant vector to vertical and horizontal comparison boundary member pairs; and
    further comparing said resultant vector to comparison boundary member diagonals coupled to said vertical and horizontal comparison boundary member pairs.

9. The method as recited in claim 8 further comprising providing a comparison signal based on signals generated from said comparing and further comparing said resultant vector.

10. The method as recited in claim 8 wherein said vertical and horizontal comparison boundary member pairs and said boundary member diagonals are substantially equal in length.

11. The method as recited in claim 8 wherein said vertical and horizontal comparison boundary member pairs and said comparison boundary member diagonals form an octagonal comparison boundary.

12. The method as recited in claim 8 wherein said comparing is performed by a non-tilted comparison circuit comprising a window comparator.

13. The method as recited in claim 8 wherein said further comparing is performed by a tilted comparison circuit comprising an absolute value circuit.

14. The method as recited in claim 8 wherein said resultant vector is based on error signal components of said in-phase and quadrature phase signals.

15. A transmitter, comprising:
    an input section and a feedback section employing in-phase and quadrature phase signals;
    a power amplifier coupled to said input and feedback sections;
    an error detection circuit, coupled to said input and feedback sections, that derives error signal components from said in-phase and quadrature phase signals;
    a comparator circuit, including:
        a non-tilted comparison circuit that compares a resultant vector based on said error signal components to vertical and horizontal comparison boundary member pairs of an octagonal comparison boundary, and
        a tilted comparison circuit, coupled to said non-tilted comparison circuit, that compares said resultant vector to comparison boundary member diagonals of said octagonal comparison boundary; and
    a control circuit, coupled to said comparator circuit, that controls a power level of said power amplifier based on a comparison signal associated with said non-tilted and tilted comparison circuits.

16. The transmitter as recited in claim 15 wherein said comparator circuit further comprises a combiner circuit that provides said comparison signal based on signals from said non-tilted and tilted comparison circuits.

17. The transmitter as recited in claim 15 wherein said vertical and horizontal comparison boundary member pairs and said boundary member diagonals are substantially equal in length.

18. The transmitter as recited in claim 15 wherein said octagonal comparison boundary approximates a circle whose radius is based on a reference parameter.

19. The transmitter as recited in claim 15 wherein said non-tilted comparison circuit comprises a window comparator.

20. The transmitter as recited in claim 15 wherein said tilted comparison circuit comprises an absolute value circuit.

* * * * *